United States Patent
Xie

(10) Patent No.: US 12,357,863 B2
(45) Date of Patent: Jul. 15, 2025

(54) INFLATABLE TRAMPOLINE AND MANUFACTURING METHOD

(71) Applicant: Penghui Xie, Shenzhen (CN)

(72) Inventor: Penghui Xie, Shenzhen (CN)

(73) Assignee: Shenzhen Jiaxin Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/023,417

(22) Filed: Jan. 16, 2025

(65) Prior Publication Data

US 2025/0152988 A1    May 15, 2025

(51) Int. Cl.
| A63B 5/11 | (2006.01) |
| B29C 65/00 | (2006.01) |
| B29C 65/04 | (2006.01) |
| B29L 31/52 | (2006.01) |

(52) U.S. Cl.
CPC ............... A63B 5/11 (2013.01); B29C 65/04 (2013.01); B29C 66/20 (2013.01); B29C 66/439 (2013.01); A63B 2225/62 (2013.01); B29L 2031/52 (2013.01)

(58) Field of Classification Search
CPC ... A63B 5/11; A63B 2225/62; A63B 2209/00; A63B 6/00; B29C 65/04; B29C 66/20; B29C 66/439; B29L 2031/52; B32B 5/245; B32B 7/09; B32B 38/00; B32B 2038/008; B63B 7/08; F16B 13/063
See application file for complete search history.

(56) References Cited

U.S. PATENT DOCUMENTS

| 4,836,530 A | * | 6/1989 | Stanley, Jr. | A63B 5/11 482/27 |
| 6,223,673 B1 | * | 5/2001 | Mears | A63B 5/11 482/29 |
| 9,283,419 B2 | * | 3/2016 | Chen | A63B 71/022 |
| 9,364,699 B2 | * | 6/2016 | Gordon | A63B 5/11 |
| 11,511,207 B2 | * | 11/2022 | Whincup | A63G 31/02 |
| 11,865,467 B2 | * | 1/2024 | Whincup | A63G 31/12 |
| 12,011,672 B2 | * | 6/2024 | Whincup | A63G 33/00 |
| 2003/0064861 A1 | * | 4/2003 | Chen | A63B 5/11 482/27 |
| 2015/0157888 A1 | * | 6/2015 | Gordon | A63G 29/00 482/27 |
| 2015/0190666 A1 | * | 7/2015 | Chen | A63B 5/11 482/29 |
| 2022/0258063 A1 | * | 8/2022 | Whincup | A63G 33/00 |
| 2023/0062317 A1 | * | 3/2023 | Whincup | A63G 31/02 |
| 2024/0082745 A1 | * | 3/2024 | Whincup | A63G 33/00 |

\* cited by examiner

*Primary Examiner* — Garrett K Atkinson

(57) ABSTRACT

The present invention provides an inflatable trampoline. The inflatable trampoline includes an inflatable frame, a connecting sheet and an elastic assembly. The inflatable frame includes a plurality of first sheets and a plurality of second sheets; a fabric layer is arranged within the first sheet, two second sheets are respectively welded to two edges of the first sheet, and two adjacent second sheets are welded to each other; the first sheet and the second sheet form the inflatable frame, and an inflatable cavity is provided within the inflatable frame. An edge of the connecting sheet is welded to an upper surface of the inflatable frame, and an opening is provided in a middle of the connecting sheet. The elastic assembly is located in the opening, and the elastic assembly is connected to the connecting sheet through a plurality of first connecting members.

5 Claims, 10 Drawing Sheets

Providing a plurality of first sheets and a plurality of second sheets, a fabric layer is arranged within the first sheet; welding two second sheets respectively to two edges of the first sheet, and welding two adjacent second sheets to each other; the first sheet and the second sheet form an inflatable frame.  —S1

Providing a connecting sheet, and welding an edge of the connecting sheet to an upper surface of the inflatable frame.  —S2

Providing an elastic assembly, and placing the elastic assembly in the opening, and connecting the elastic assembly to the connecting sheet by using a plurality of first connecting members.  —S3

Figure 14

INFLATABLE TRAMPOLINE AND MANUFACTURING METHOD

TECHNICAL FIELD

The present disclosure relates to the field of inflatable trampolines, and in particular, to an inflatable trampoline and a manufacturing method for the inflatable trampoline.

BACKGROUND OF THE INVENTION

With the rapid development of the social economy, inflatable trampolines are widely used in children's amusement facilities. They can not only be placed on the ground but also float on the water. People can jump freely on them and relax, entertain and exercise during the jumping process. Whether in squares, amusement parks, seashores, lakes or swimming pools, inflatable trampolines are the most attractive items.

In the prior art, inflatable trampolines usually weld multiple PVC sheets to form an inflatable frame. However, such products have poor wear resistance, tear resistance, short product life, and poor elasticity. There are also products that form a laminated fabric by arranging a fabric layer within the PVC sheet and paste multiple laminated fabrics to form an approximately circular inflatable frame, and an elastic trampoline bed surface is set in the middle of the inflatable frame. The inflatable frame can be placed on the ground or float on the water surface. However, the production process of such products is complex, too many sheets need to be pasted, and the connection by pasting easily leads to problems such as poor airtightness of the product. Moreover, the work of pasting the sheets can only be operated by skilled workers, resulting in low production efficiency and high cost. Since there is a fabric layer inside the laminated fabric, its welding performance is poor, and existing products cannot directly stack and weld the laminated fabrics to each other.

Therefor, the present invention provides an inflatable trampoline and a manufacturing method thereof, which can effectively solve the above problems. It has a simple structure, good sealing effect, simple production process, strong wear resistance and tear resistance of the product, is portable and easy to use, has high production efficiency of the product, and low production cost.

SUMMARY OF THE INVENTION

The present invention provides an inflatable trampoline and a manufacturing method thereof, which has a simple structure, good sealing effect, simple production process, strong wear resistance.

The technical solution adopted by the present invention to solve the technical problem is as follows.

The present invention provides an inflatable trampoline. The inflatable trampoline includes an inflatable frame, a connecting sheet and an elastic assembly. The inflatable frame includes a plurality of first sheets and a plurality of second sheets; a fabric layer is arranged within the first sheet, two second sheets are respectively welded to two edges of the first sheet, and two adjacent second sheets are welded to each other; the first sheet and the second sheet form the inflatable frame, and an inflatable cavity is provided within the inflatable frame. An edge of the connecting sheet is welded to an upper surface of the inflatable frame, and an opening is provided in a middle of the connecting sheet. The elastic assembly is located in the opening, and the elastic assembly is connected to the connecting sheet through a plurality of first connecting members.

As an improvement of the present invention, a first welding zone is arranged at each of two edges of the first sheet, a second welding zone is arranged at one edge of the second sheet adjacent to the first sheet, and the first welding zone and the second welding zone are stacked one above the other and welded to each other.

As an improvement of the present invention, a distance between the fabric layer and an upper surface of the first sheet is less than that between the fabric layer and a lower surface of the first sheet, and a lower surface of the first welding zone is attached to and welded to an upper surface of the second welding zone.

As an improvement of the present invention, a third welding zone is arranged at an edge of the second sheet away from the first sheet, and the third welding zones of two adjacent second sheets are welded together.

As an improvement of the present invention, inner surfaces of the third welding zones of two adjacent second sheets are attached and welded to each other.

As an improvement of the present invention, the number of the first sheet is four, and the number of the second sheet is eight; a head end and a tail end of each first sheet are adjacent to each other, and a head end and a tail end of each second sheet are adjacent to each other; the first sheets and the second sheets form the inflatable frame in a circular ring shape.

As an improvement of the present invention, an air valve assembly is arranged on the first sheet, and at least a part of the air valve assembly penetrates through a sidewall of the first sheet; the air valve assembly is opened to allow air to flow into or out of the inflatable cavity.

As an improvement of the present invention, the air valve assembly includes a valve main body and a valve cover, the valve main body is provided with an airflow channel, and the valve cover is detachably connected to the valve main body; when the valve cover is connected to the valve main body, the valve cover covers the airflow channel.

As an improvement of the present invention, the air valve assembly further includes a connecting belt, and one end of the connecting belt is connected to the valve main body, and the other end of the connecting belt is connected to the valve cover.

As an improvement of the present invention, the inflatable trampoline further includes a handle assembly, the handle assembly is connected to an outer surface of the first sheet; the handle assembly includes a handle and a handle connecting member; the handle connecting member is connected to the outer surface of the first sheet, and the handle is connected to an outer surface of the handle connecting member.

As an improvement of the present invention, the elastic assembly includes an elastic rope and an elastic mesh fabric; the elastic rope is connected to the connecting sheet through the first connecting member, and the elastic mesh fabric is connected to the elastic rope through a plurality of second connecting members.

As an improvement of the present invention, the first connecting member is a flat cloth strip, two ends of the first connecting member are stacked one above the other and are connected to a lower surface of the connecting sheet through a first sewing thread, and the first connecting member is sleeved on the elastic rope.

As an improvement of the present invention, two connecting portions are arranged at an edge of the elastic mesh fabric; the second connecting member is a flat cloth strip, and two ends of the second connecting member are stacked one above the other; the two connecting portions are clamped by the two ends of the second connecting member and are connected to the two ends of the second connecting member through a second sewing thread; the second connecting member is sleeved on the elastic rope.

As an improvement of the present invention, both the first connecting member and the second connecting member form cloth-strip loops, and the first connecting member and the second connecting member are alternately sleeved on the elastic rope.

As an improvement of the present invention, the elastic mesh fabric is circular in shape, and the second connecting members are arranged at regular equal intervals along a circumferential direction of an edge of the elastic mesh fabric.

The present invention also provides a manufacturing method for an inflatable trampoline, including: Providing a plurality of first sheets and a plurality of second sheets. A fabric layer is arranged within the first sheet, welding two second sheets respectively to two edges of the first sheet, and welding two adjacent second sheets to each other; the first sheet and the second sheet form an inflatable frame, and an inflatable cavity is provided within the inflatable frame; Providing a connecting sheet, welding an edge of the connecting sheet to an upper surface of the inflatable frame, and an opening is provided in a middle of the connecting sheet; Providing an elastic assembly, placing the elastic assembly in the opening, and connecting the elastic assembly to the connecting sheet by using a plurality of first connecting members.

As an improvement of the present invention, a step of "welding two second sheets respectively to two edges of the first sheet" includes: arranging a first welding zone at each of the two edges of the first sheet, arranging a second welding zone at an edge of the second sheet adjacent to the first sheet, aligning the first welding zone and the second welding zone to stack one above the other, and welding the first welding zone and the second welding zone by using a high-frequency plastic welding machine.

As an improvement of the present invention, a step of "welding two adjacent second sheets to each other" includes: arranging a third welding zone at an edge of the second sheet away from the first sheet, aligning the third welding zones of the two adjacent second sheets, and then welding the third welding zones of the two adjacent second sheets by using a high-frequency plastic welding machine.

As an improvement of the present invention, a step of "placing the elastic assembly in the opening, and connecting the elastic assembly to the connecting sheet by using a plurality of first connecting members" includes: the elastic assembly includes an elastic rope and an elastic mesh fabric; the elastic mesh fabric is connected to the elastic rope through a plurality of second connecting members, and then the elastic rope is connected to the connecting sheet through the first connecting member.

As an improvement of the present invention, before a step of "welding the plurality of the first sheets and the plurality of the second sheets to form an inflatable frame", it also includes: providing an air valve assembly and a handle assembly, making at least a part of the air valve assembly penetrate through a sidewall of the first sheet, and connecting the handle assembly to an outer surface of the first sheet.

Beneficial effects of the present invention are as follows. Through the arrangement of the above structure, during use, air is injected into the inflatable cavity to inflate the inflatable frame and make it rigid, providing a stable supporting force. Users can sit, lie, walk or jump on the elastic assembly. The elastic force of the elastic assembly can effectively drive users to jump or support them. The force acting on the elastic assembly is evenly applied to the inflatable frame through the connecting sheet, and the inflatable frame can provide stable support. Moreover, since the inflatable frame has the inflatable cavity and has a low density, it can float on the water surface under the action of buoyancy, increasing the applicable scenarios and interestingness of the product. Among them, both the first sheet and the second sheet are PVC sheets. The fabric layer is arranged within the first sheet. The fabric layer can provide a supporting force to prevent the first sheet from deforming under force, maintain the stability of the product, and also enhance the wear resistance, tear resistance and weather resistance of the product, effectively prolonging the service life of the product. However, since the fabric layer is arranged within the first sheet, compared with the second sheet made of pure PVC material, the weldability of the first sheet is poor. Directly welding two first sheets is likely to cause the connection to break. Connecting two adjacent first sheets through the second sheet can improve the stability of the connection and ensure the airtightness and structural stability of the product.

BRIEF DESCRIPTION OF DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

In order to explain the technical solutions of the embodiments of the present invention more clearly, the following will briefly introduce the accompanying drawings used in the embodiments. Apparently, the drawings in the following description are only some embodiments of the present invention. Those of ordinary skill in the art can obtain other drawings based on these drawings without creative work.

The present invention is further described below in detail in combination with the accompanying drawings and embodiments.

Figure 1:
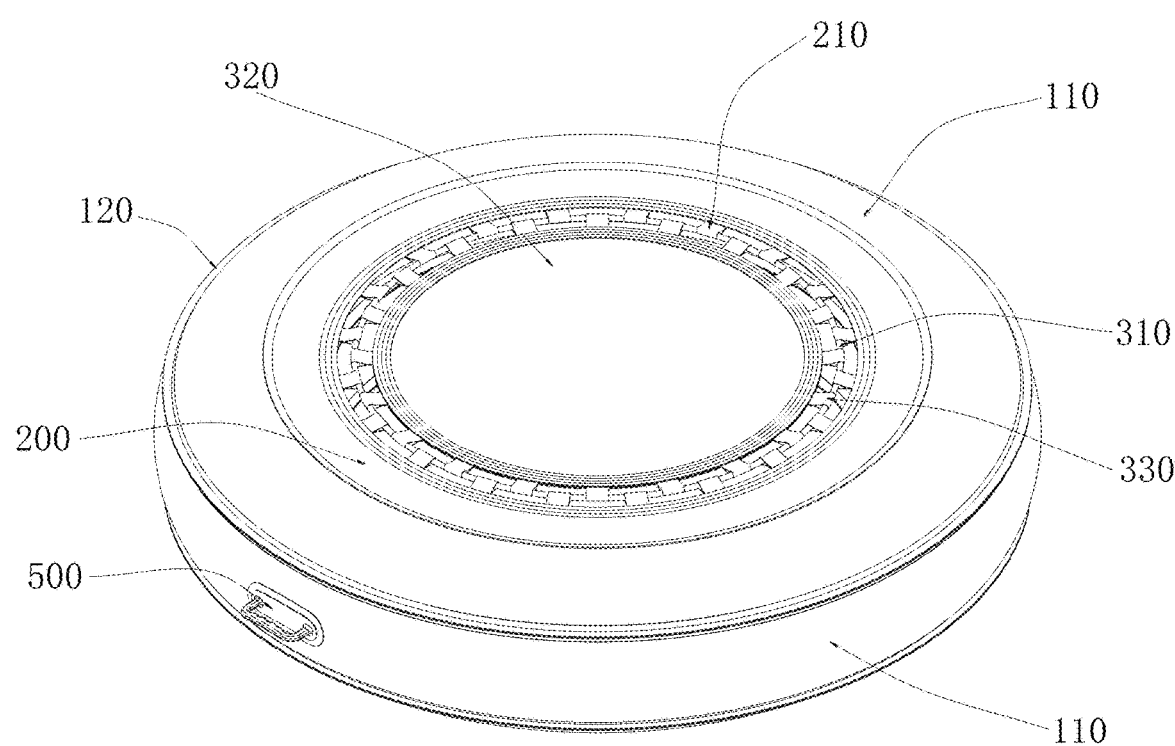
Figure 2:
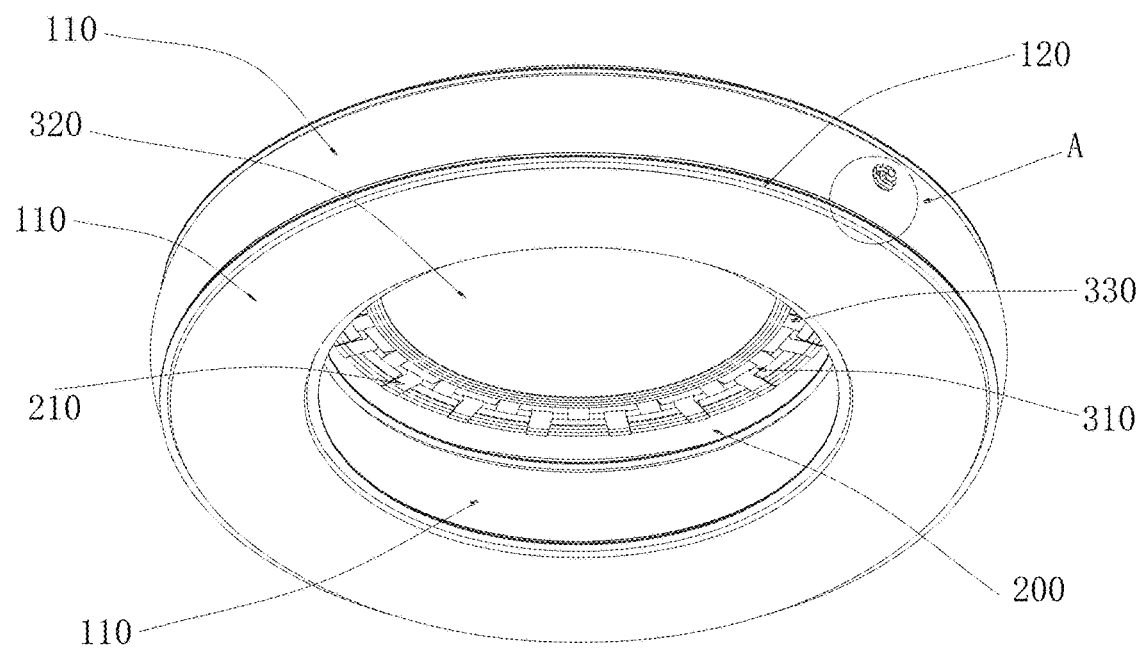
Figure 3:
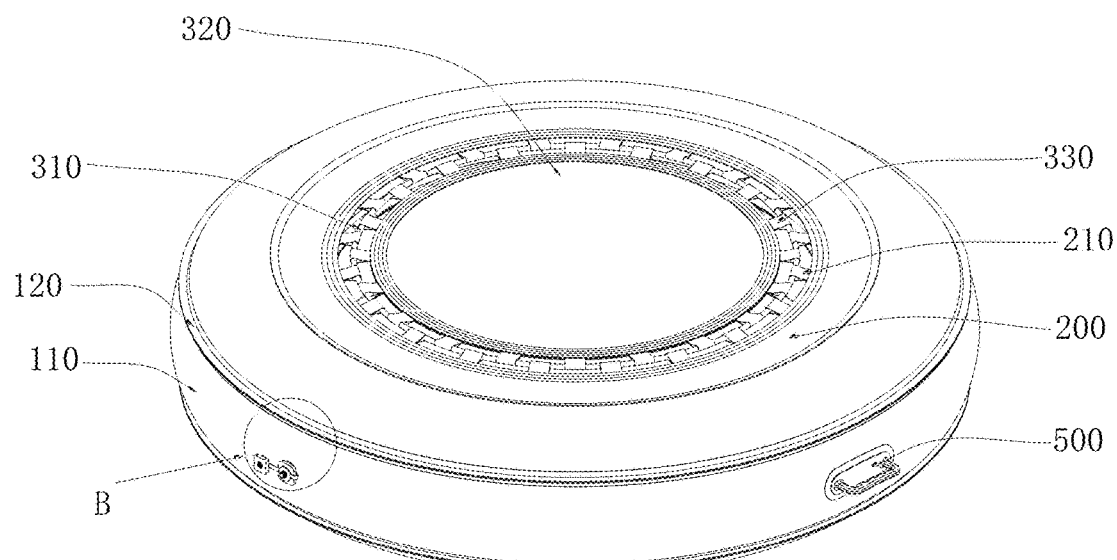
Figure 4:
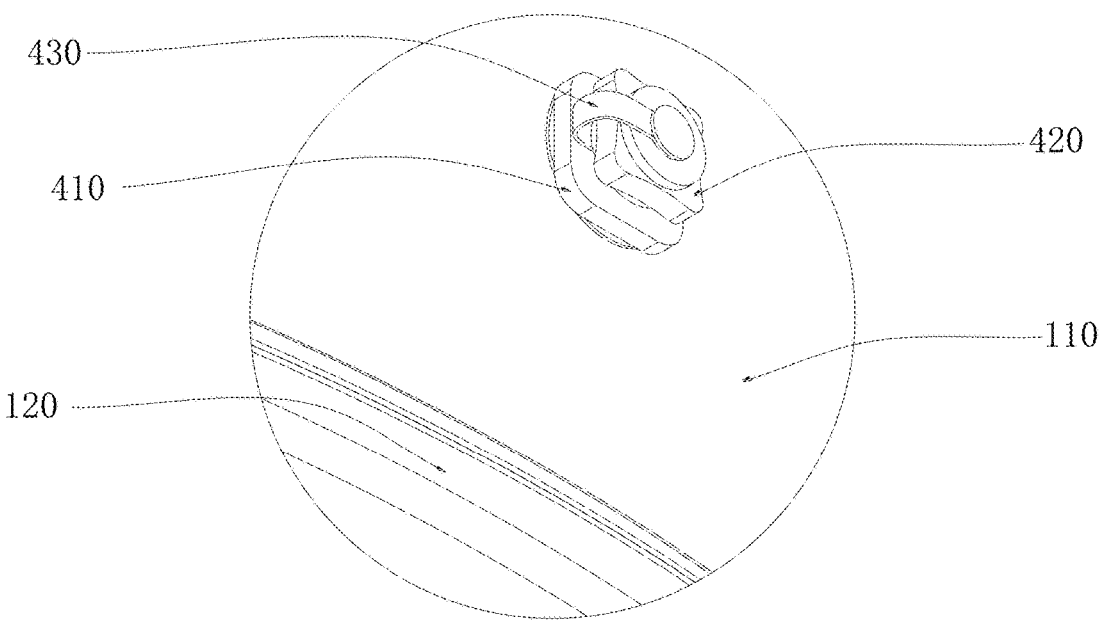
Figure 5:
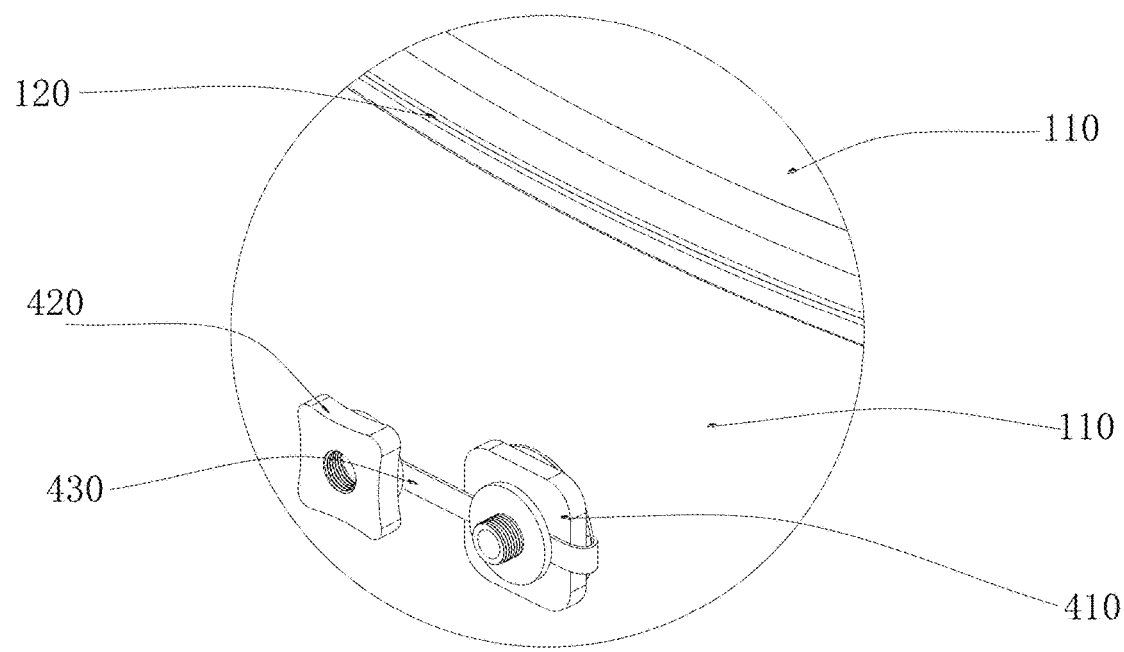
Figure 6:
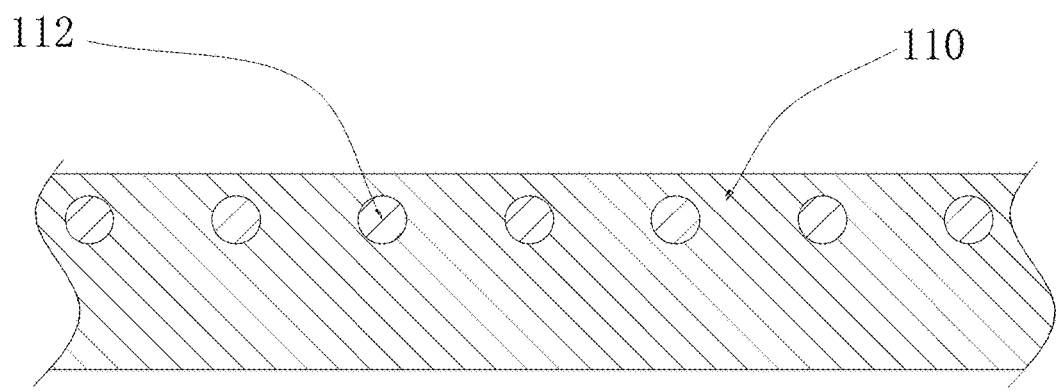
Figure 7:
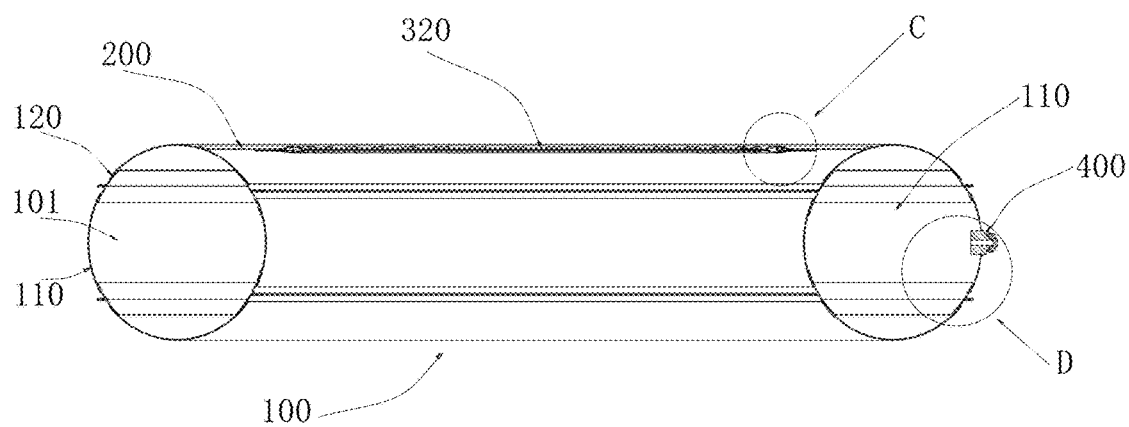
Figure 8:
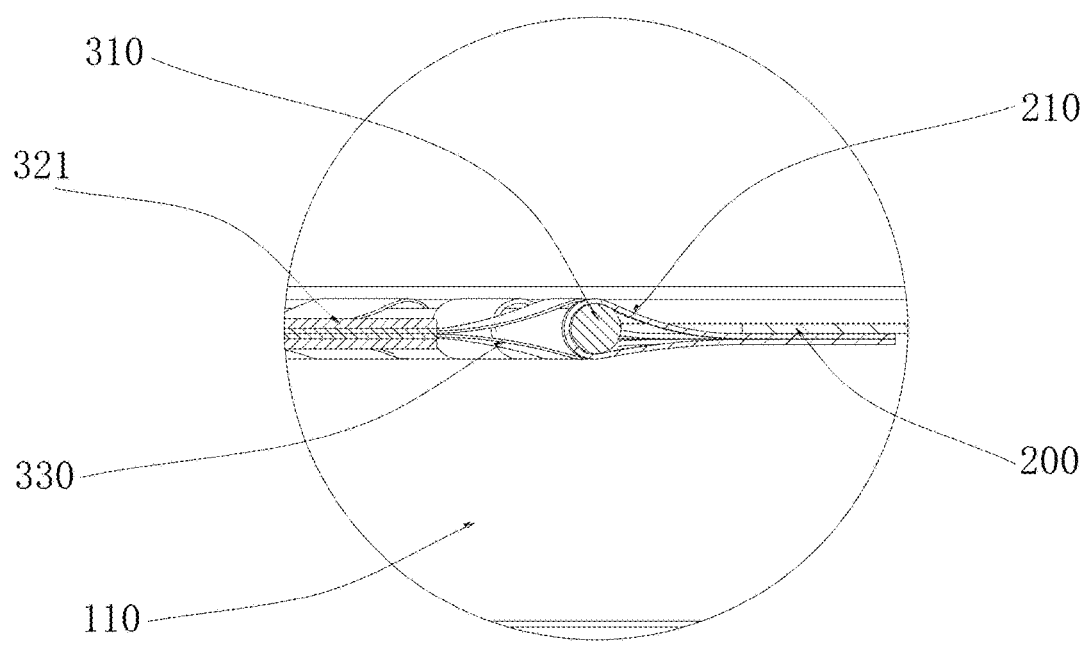
Figure 9:
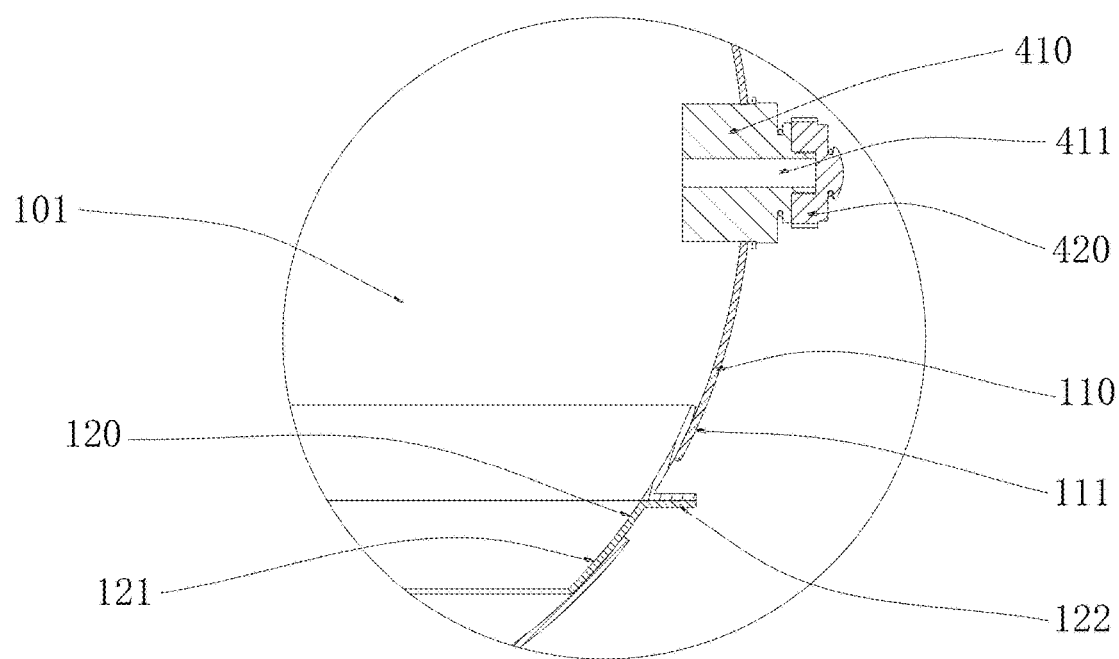
Figure 10:
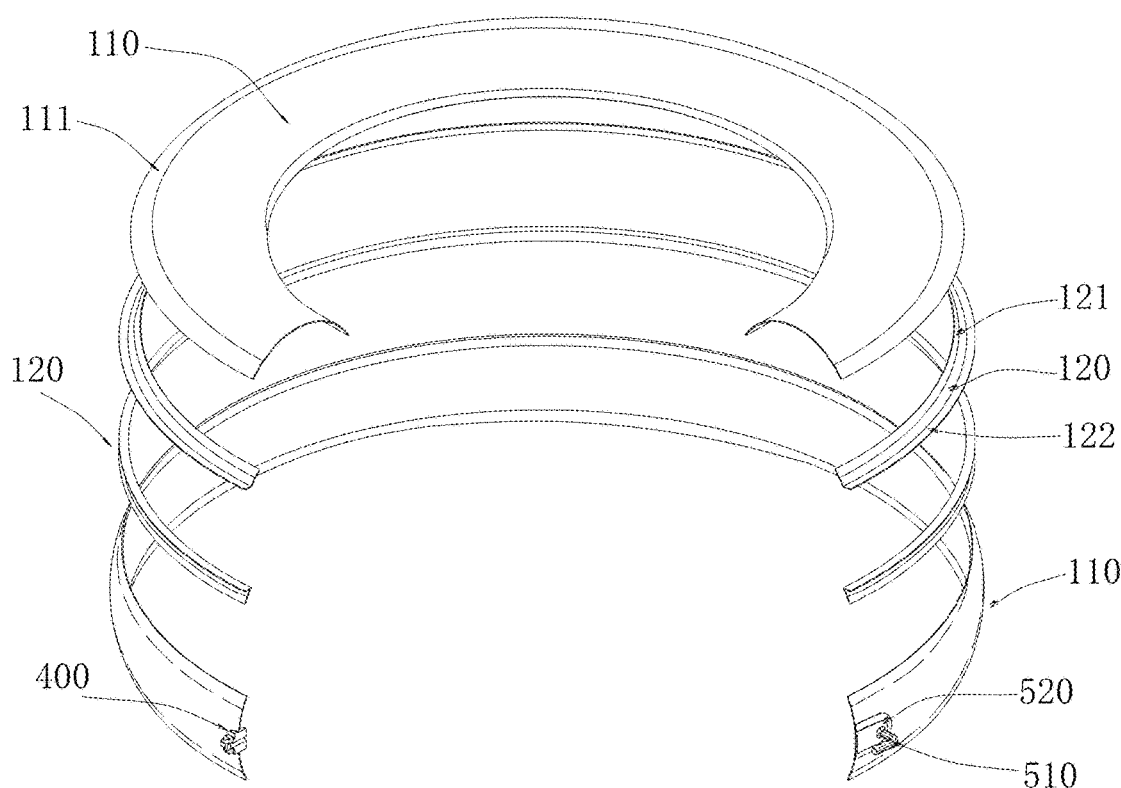
Figure 11:
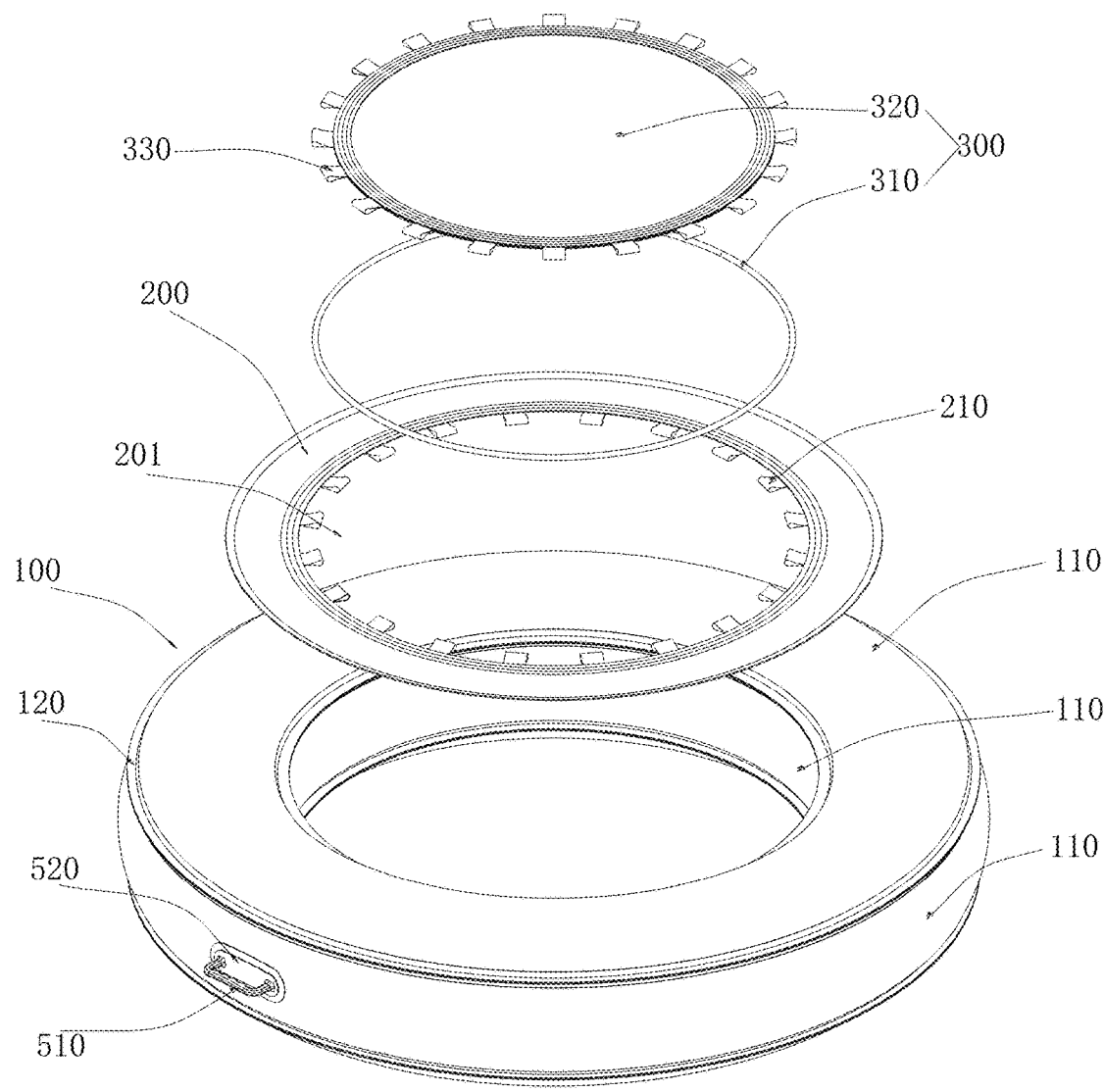
Figure 12:
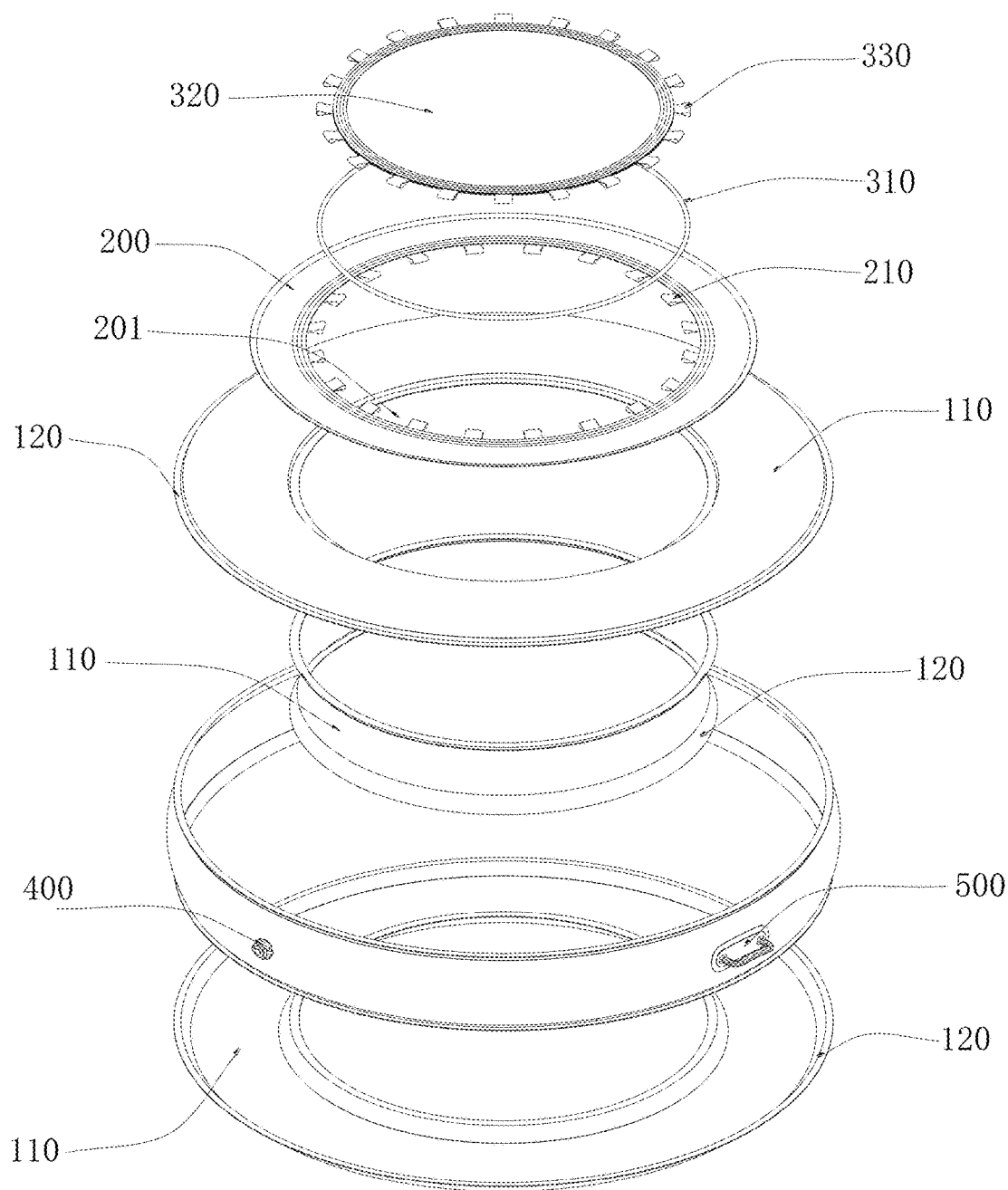
Figure 13:
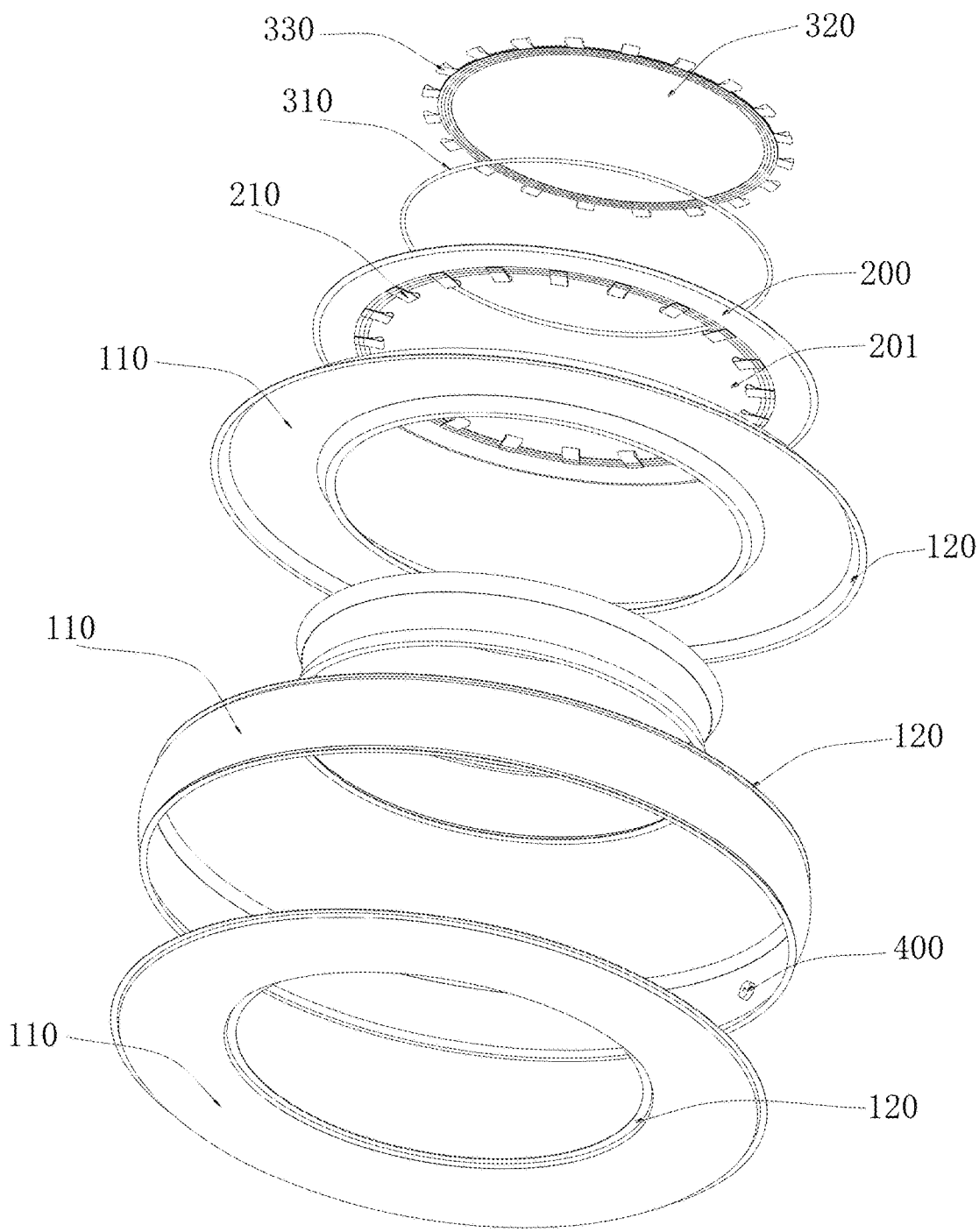

FIG. 1 is a schematic diagram from an angle of an overall structure of the present invention;

FIG. 2 is a schematic diagram from another angle of the overall structure of the present invention;

FIG. 3 is a schematic diagram of the overall structure in an opened state of an air valve assembly of the present invention;

FIG. 4 is an enlarged diagram of an area A in FIG. 2;

FIG. 5 is an enlarged diagram of an area B in FIG. 3;

FIG. 6 is a partial cross-sectional view of a first sheet of the present invention;

FIG. 7 is cross-sectional view of the present invention;

FIG. 8 is an enlarged s diagram of an area C in FIG. 7;

FIG. 9 is an enlarged s diagram of an area D in FIG. 7;

FIG. 10 is a schematic partial structural diagram of an inflatable frame of the present invention;

FIG. 11 is a schematic diagram of a first exploded structure of the present invention;

FIG. 12 is a schematic diagram of a second exploded structure of the present invention;

FIG. 13 is a schematic diagram of a third exploded structure of the present invention; and FIG. 14 is a schematic diagram of a manufacturing method process of the present invention.

DETAILED DESCRIPTION OF THE INVENTION

To make the aforementioned objectives, features, and advantages of the present disclosure more comprehensible, specific implementations of the present disclosure are described in detail below in conjunction with the accompanying drawings. In the following description, numerous specific details are set forth to provide a thorough understanding of the present disclosure. The present disclosure may, however, be embodied in many forms different from that described here. A person skilled in the art can make similar improvements without departing from the connotation of the present disclosure. Therefore, the present disclosure is not limited by the specific embodiments disclosed below.

In the description of the present disclosure, It is to be understood that, The terms "center", "longitudinal", "transverse", "upper", "lower", "front", "rear", "left", "right", "vertical", "horizontal", "top", "bottom", "inner", "outer", "clockwise", "counterclockwise", and the like indicate azimuth or positional relationships based on the azimuth or positional relationships shown in the drawings, For purposes of convenience only of describing the present disclosure and simplifying the description, Rather than indicating or implying that the indicated device or element must have a particular orientation, be constructed and operated in a particular orientation, therefore, not to be construed as limiting the present disclosure.

In addition, the terms "first" and "second" are used for descriptive purposes only, while not to be construed as indicating or implying relative importance or implicitly specifying the number of technical features indicated thereby, features defining "first," "second," and "second" may explicitly or implicitly include one or more of the described features. In the description of the present disclosure, "multiple" means two or more unless explicitly specified otherwise.

In addition, the terms "install", "arrange", "provide", "connect" and "couple" should be understood broadly. For example, it can be a fixed connection, a detachable connection, an integral structure, a mechanical connection, an electrical connection, a direct connection, an indirect connection through an intermediate medium, or a communication between two devices, elements or components. For ordinary technical personnel in this field, the specific meanings of the above terms in present disclosure can be understood based on specific circumstances.

In the present disclosure, unless specific regulation and limitation otherwise, the first feature "onto" or "under" the second feature may include the direct contact of the first feature and the second feature, or may include the contact of the first feature and the second feature through other features between them instead of direct contact. Moreover, the first feature "onto", "above" and "on" the second feature includes that the first feature is right above and obliquely above the second feature, or merely indicates that the horizontal height of the first feature is higher than the second feature. The first feature "under", "below" and "down" the second feature includes that the first feature is right above and obliquely above the second feature, or merely indicates that the horizontal height of the first feature is less than the second feature.

It should be noted that when an element is referred to as being "fixed to" another element, the element can be directly on another component or there can be a centered element. When an element is considered to be "connected" to another element, the element can be directly connected to another element or there may be a centered element. The terms "inner", "outer", "left", "right", and similar expressions used herein are for illustrative purposes only and do not necessarily represent the only implementation.

Referring to FIG. 1 to FIG. 13, an inflatable trampoline includes an inflatable frame 100, and the inflatable frame 100 includes a plurality of first sheets 110 and a plurality of second sheets 120. A fabric layer 112 is arranged within the first sheet 110, two second sheets 120 are respectively welded to two edges of the first sheet 110, and two adjacent second sheets 120 are welded to each other. The first sheet 110 and the second sheet 120 form the inflatable frame 100, and an inflatable cavity 101 is provided within the inflatable frame 100.

The inflatable trampoline includes a connecting sheet 200, an edge of the connecting sheet 200 is welded to an upper surface of the inflatable frame 100, and an opening 201 is provided in a middle of the connecting sheet 200.

The inflatable trampoline further includes an elastic assembly 300, the elastic assembly 300 is located in the opening 201, and the elastic assembly 300 is connected to the connecting sheet 200 through a plurality of first connecting members 210.

Through the arrangement of the above structure, during use, air is injected into the inflatable cavity 101 to inflate the inflatable frame 100 and make it rigid, providing a stable supporting force. Users can sit, lie, walk or jump on the elastic assembly 300. The elastic force of the elastic assembly 300 can effectively drive users to jump or support them. The force acting on the elastic assembly 300 is evenly applied to the inflatable frame 100 through the connecting sheet 200, and the inflatable frame 100 can provide stable support. Moreover, since the inflatable frame 100 has the inflatable cavity 101 and has a low density, it can float on the water surface under the action of buoyancy, increasing the applicable scenarios and interestingness of the product. Among them, both the first sheet 110 and the second sheet 120 are PVC sheets. The fabric layer 112 is arranged within the first sheet 110. The fabric layer 112 can provide a supporting force to prevent the first sheet 110 from deforming under force, maintain the stability of the product, and also enhance the wear resistance, tear resistance and weather resistance of the product, effectively prolonging the service life of the product. However, since the fabric layer 112 is arranged within the first sheet 110, compared with the second sheet 120 made of pure PVC material, the weldability of the first sheet 110 is poor. Directly welding two first sheets 110 is likely to cause the connection to break. Connecting two adjacent first sheets 110 through the second sheet 120 can improve the stability of the connection and ensure the airtightness and structural stability of the product.

In this embodiment, a first welding zone 111 is arranged at each of two edges of the first sheet 110, a second welding zone 121 is arranged at one edge of the second sheet 120 adjacent to the first sheet 110, and the first welding zone 111 and the second welding zone 121 are stacked one above the other and welded to each other. Through the arrangement of the above structure, by stacking the first welding zone 111 and the second welding zone 121 one above the other, the contact area between them can be increased. Moreover, it can effectively prevent the first sheet 110 and the second sheet 120 from moving and deforming during the welding process, ensuring the stability of the connection. Then, a high-frequency plastic welding machine is used to weld the first welding zone 111 and the second welding zone 121, ensuring the stability of the product and effectively reducing the occurrence of situations such as breakage or air leakage at the connection between the first sheet 110 and the second sheet 120.

In this embodiment, a distance between the fabric layer 112 and an upper surface of the first sheet 110 is less than that between the fabric layer 112 and a lower surface of the first sheet 110, and a lower surface of the first welding zone 111 is attached to and welded to an upper surface of the second welding zone 121. Through the arrangement of the above structure, since the distance between the fabric layer 112 and the upper surface of the first sheet 110 is less than that between the fabric layer 112 and the lower surface of the first sheet 110, the thickness of the PVC layer at the lower surface of the first sheet 110 is relatively large. Attaching and welding the lower surface of the first welding zone 111 to the upper surface of the second welding zone 121 can further ensure the stability of the connection between the first sheet 110 and the second sheet 120, and ensure the airtightness and service life of the product. At the same time, as the distance between the fabric layer 112 and the upper surface of the first sheet 110 is small, the fabric layer 112 is adjacent to the outer surface of the first sheet 110, which can further enhance the wear resistance, tear resistance and weather resistance of the product.

In this embodiment, a third welding zone 122 is arranged at an edge of the second sheet 120 away from the first sheet 110, and the third welding zones 122 of two adjacent second sheets 120 are welded together. Through the arrangement of the above structure, during product production, the third welding zones 122 of two adjacent second sheets 120 are aligned and extended outwards. Then, a high-frequency plastic welding machine is used to weld the two third welding zones 122, achieving the connection between the two adjacent second sheets 120. Since the second sheet 120 is made of pure PVC material, the connection between two adjacent second sheets 120 is stable, ensuring the airtightness of the product. Aligning the third welding zones 122 of two adjacent second sheets 120 and extending them outwards enables the high-frequency plastic welding machine to act on the third welding zones 122 more easily, reducing the production difficulty and improving the production efficiency.

In this embodiment, inner surfaces of the third welding zones 122 of two adjacent second sheets 120 are attached and welded to each other. Through the arrangement of the above structure, during product production, the inner surfaces of the third welding zones 122 of two second sheets 120 are made to adhere to each other. At this time, the third welding zones 122 protrude outwards. Then, the high-frequency plastic welding machine is used to weld the two third welding zones 122. This operation is simple and features high production efficiency.

In this embodiment, the number of the first sheet 110 is four, and the number of the second sheet 120 is eight; a head end and a tail end of each first sheet 110 are adjacent to each other, and a head end and a tail end of each second sheet 120 are adjacent to each other; the first sheets 110 and the second sheets 120 form the inflatable frame 100 in a circular ring shape. Through the arrangement of the above structure, the circular ring shaped inflatable frame 100 has a relatively uniform force distribution in all parts, which leads to a longer service life of the product. Moreover, a concave area is formed in the middle of the inflatable frame 100, providing deformation space for the elastic assembly 300. This enables users to jump more easily when using the product, resulting in superior product performance.

In this embodiment, an air valve assembly 400 is arranged on the first sheet 110, and at least a part of the air valve assembly 400 penetrates through a sidewall of the first sheet 110; the air valve assembly 400 is opened to allow air to flow into or out of the inflatable cavity 101. Through the arrangement of the above structure, during use, open up the air valve assembly 400 and use devices such as an air pump to inflate the product, filling the inflatable cavity 101 with air to form a stable structure of the inflatable frame 100. Then close the air valve assembly 400 to ensure the airtightness of the product. When the product needs to be stored, the air valve assembly 400 can be opened to discharge the air in the inflatable cavity 101, thereby reducing the volume of the product, which facilitates users to store and transport the product.

In this embodiment, the air valve assembly 400 includes a valve main body 410 and a valve cover 420, the valve main body 410 is provided with an airflow channel 411, and the valve cover 420 is detachably connected to the valve main body 410; when the valve cover 420 is connected to the valve main body 410, the valve cover 420 covers the airflow channel 411. Through the arrangement of the above structure, during use, users open the valve cover 420, and use devices such as an air pump to aim at the airflow channel 411 to inflate the product, filling the inflatable cavity 101 with air to form a stable structure of the inflatable frame 100. Then, use the valve cover 420 to close the airflow channel 411 to ensure the airtightness of the product. When the product needs to be stored, the airflow channel 411 can be opened to discharge the air in the inflatable cavity 101 through the airflow channel 411, reducing the volume of the product, which facilitates users to store and transport the product. Preferably, a check-valve device, such as a one-way valve or a diaphragm, is also arranged within the airflow channel 411.

In this embodiment, the air valve assembly 400 further includes a connecting belt 430, and one end of the connecting belt 430 is connected to the valve main body 410, and the other end of the connecting belt 430 is connected to the valve cover 420. Through the arrangement of the above structure, the connecting belt 430 can connect the valve cover 420 to the valve main body 410, preventing the valve cover 420 from getting lost after being opened and enhancing the user's using experience.

In this embodiment, the inflatable trampoline further includes a handle assembly 500, and the handle assembly 500 is connected to an outer surface of the first sheet 110. The handle assembly 500 includes a handle 510 and a handle connecting member 520. The handle connecting member 520 is connected to the outer surface of the first sheet 110, and the handle 510 is connected to an outer surface of the handle connecting member 520. Through the arrangement of the above structure, by connecting the handle connecting member 520 to the outer surface of the first sheet 110, and then connecting the handle 510 to the outer surface of the handle connecting member 520, the handle 510 can be effectively fixed. Moreover, the relatively large area of the part where the handle connecting member 520 adheres to the outer surface of the first sheet 110 provides the product with high stability and a stable structure.

In this embodiment, the elastic assembly 300 includes an elastic rope 310 and an elastic mesh fabric 320; the elastic rope 310 is connected to the connecting sheet 200 through the first connecting member 210, and the elastic mesh fabric 320 is connected to the elastic rope 310 through a plurality of second connecting members 330. Through the arrangement of the above structure, during product production, the elastic rope 310 is connected to the elastic mesh fabric 320 through the second connecting members 330, and then the elastic rope 310 is connected to the connecting sheet 200 through the first connecting member 210. When a user moves on the elastic mesh fabric 320, the elastic rope 310 deforms and then resets, and the elastic force provided can effectively drive the user to jump up.

In this embodiment, the first connecting member 210 is a flat cloth strip, two ends of the first connecting member 210 are stacked one above the other and are connected to a lower surface of the connecting sheet 200 through a first sewing thread, and the first connecting member 210 is sleeved on the elastic rope 310. Through the arrangement of the above structure, by means of sewing, the two ends of the first connecting member 210 can be stably connected to the lower surface of the connecting sheet 200, forming a cloth-strip loop. The elastic rope 310 is passed through the cloth-strip loop, which is convenient for connection. Moreover, the flat cloth strip provides a large contact area with the elastic rope 310, enabling the force to act uniformly on the elastic rope 310. As a result, the product has a stable structure and a long lifespan.

In this embodiment, two connecting portions 321 are arranged at an edge of the elastic mesh fabric 320; the second connecting member 330 is a flat cloth strip, and two ends of the second connecting member 330 are stacked one above the other; the two connecting portions 321 are clamped by the two ends of the second connecting member 330 and are connected to the two ends of the second connecting member 330 through a second sewing thread; the second connecting member 330 is sleeved on the elastic rope 310. Through the arrangement of the above structure, by means of sewing, the two ends of the second connecting member 330 can be stably connected to the connecting portions 321 at the edge of the elastic mesh fabric 320, forming a cloth-strip loop of the second connecting member 330. The elastic rope 310 is passed through the cloth-strip loop, which is convenient for connection. Moreover, the flat cloth strip provides a large contact area for the elastic rope 310, enabling the force to act uniformly on the elastic rope 310. As a result, the product has a stable structure and a long lifespan. Specifically, the two connecting portions 321 are clamped on the upper and lower sides of the ends of the second connecting member 330, making the product connection more stable.

In this embodiment, both the first connecting member 210 and the second connecting member 330 form cloth-strip loops, and the first connecting member 210 and the second connecting member 330 are alternately sleeved on the elastic rope 310. Through the arrangement of the above structure, the first connecting member 210 and the second connecting member 330 are alternately sleeved on the elastic rope 310, which can enable the force acting on the elastic rope 310 in the diameter direction to be balanced, thus ensuring the product with a stable structure.

In this embodiment, the elastic mesh fabric 320 is circular in shape, and the second connecting members 330 are arranged at regular equal intervals along a circumferential direction of an edge of the elastic mesh fabric 320. Through the arrangement of the above structure, the second connecting members 330 are arranged at regular equal intervals along the circumferential direction. This enables the forces exerted on the elastic mesh fabric 320 to be evenly transferred to the elastic rope 310 through the second connecting members 330, ensuring balanced force on the product.

Referring to FIG. 1 to FIG. 14, a manufacturing method for an inflatable trampoline, including:

Step S1: providing a plurality of first sheets 110 and a plurality of second sheets 120, wherein a fabric layer 112 is arranged within the first sheet 110, welding two second sheets 120 respectively to two edges of the first sheet 110, and welding two adjacent second sheets 120 to each other; the first sheet 110 and the second sheet 120 form an inflatable frame 100, and an inflatable cavity 101 is provided within the inflatable frame 100;

Step S2: providing a connecting sheet 200, welding an edge of the connecting sheet 200 to an upper surface of the inflatable frame 100, and an opening 201 is provided in the middle of the connecting sheet 200;

Step S3: providing an elastic assembly 300, placing the elastic assembly 300 in the opening 201, and connecting the elastic assembly 300 to the connecting sheet 200 by using a plurality of first connecting members 210.

In this embodiment, step S1 further includes: arranging a first welding zone 111 at each of the two edges of the first sheet 110, arranging a second welding zone 121 at an edge of the second sheet 120 adjacent to the first sheet 110, aligning the first welding zone 111 and the second welding zone 121 to stack one above the other, and welding the first welding zone 111 and the second welding zone 121 by using a high-frequency plastic welding machine.

In this embodiment, step S1 further includes: arranging a third welding zone 122 at an edge of the second sheet 120 away from the first sheet 110, aligning the third welding zones 122 of the two adjacent second sheets 120, and then welding them by using a high-frequency plastic welding machine.

In this embodiment, step S3 further includes: the elastic assembly 300 includes an elastic rope 310 and an elastic mesh fabric 320; the elastic mesh fabric 320 is connected to the elastic rope 310 through a plurality of second connecting members 330, and then the elastic rope 310 is connected to the connecting sheet 200 through the first connecting member 210.

In this embodiment, before step S1 it also includes: providing an air valve assembly 400 and a handle assembly 500, making at least a part of the air valve assembly 400 penetrate through a sidewall of the first sheet 110, and connecting the handle assembly 500 to an outer surface of the first sheet 110.

The invention claimed is:

1. A manufacturing method for an inflatable trampoline, comprising:

Providing a plurality of first sheets and a plurality of second sheets, wherein a fabric layer is arranged within at least one of the first sheets, welding two second sheets respectively to two edges of at least one of the first sheets, and welding two adjacent second sheets to each other; the first sheets and the second sheets form an inflatable frame, and an inflatable cavity is provided within the inflatable frame;

Providing a connecting sheet, and welding an edge of the connecting sheet to an upper surface of the inflatable frame, and an opening is provided in a middle of the connecting sheet;

Providing an elastic assembly, and placing the elastic assembly in the opening, and connecting the elastic assembly to the connecting sheet by using a plurality of first connecting members.

2. The manufacturing method for an inflatable trampoline according to claim 1, wherein the step of "welding two second sheets respectively to two edges of the first sheet" comprises: arranging a first welding zone at each of the two edges of the first sheet, arranging a second welding zone at an edge of the second sheet adjacent to the first sheet, aligning the first welding zone and the second welding zone to stack one above the other, and welding the first welding zone and the second welding zone by using a high-frequency plastic welding machine.

3. The manufacturing method for an inflatable trampoline according to claim 1, wherein the step of "welding two adjacent second sheets to each other" comprises: arranging a third welding zone at an edge of the second sheet away from the first sheet, aligning the third welding zones of the two adjacent second sheets, and then welding the third welding zones of the two adjacent second sheets by using a high-frequency plastic welding machine.

4. The manufacturing method for an inflatable trampoline according to claim 1, wherein the step of "placing the elastic assembly in the opening, and connecting the elastic assembly to the connecting sheet by using a plurality of first connecting members" comprises: the elastic assembly comprises an elastic rope and an elastic mesh fabric; the elastic mesh fabric is connected to the elastic rope through a plurality of second connecting members, and then the elastic rope is connected to the connecting sheet through the first connecting member.

5. The manufacturing method for an inflatable trampoline according to claim 1, wherein before the step of "welding two second sheets respectively to two edges of at least one of the first sheets, and welding two adjacent second sheets to each other; the first sheets and the second sheets form an inflatable frame", providing an air valve assembly and a handle assembly, making at least a part of the air valve assembly penetrate through a sidewall of at least one of the first sheets, and connecting the handle assembly to an outer surface of thereof.

* * * * *